United States Patent
Kim et al.

(10) Patent No.: US 9,066,334 B2
(45) Date of Patent: Jun. 23, 2015

(54) METHOD FOR TRANSMITTING/RECEIVING CONTROL CHANNEL IN MULTICELL COOPERATIVE WIRELESS COMMUNICATION SYSTEM AND DEVICE THEREFOR

(75) Inventors: Hyungtae Kim, Anyang-si (KR);
Jonghyun Park, Anyang-si (KR);
Seungmin Lee, Anyang-si (KR);
Inkwon Seo, Anyang-si (KR);
Youngseob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/982,246

(22) PCT Filed: Feb. 21, 2012

(86) PCT No.: PCT/KR2012/001301
§ 371 (c)(1),
(2), (4) Date: Jul. 26, 2013

(87) PCT Pub. No.: WO2012/115427
PCT Pub. Date: Aug. 30, 2012

(65) Prior Publication Data
US 2013/0315184 A1    Nov. 28, 2013

Related U.S. Application Data

(60) Provisional application No. 61/445,553, filed on Feb. 23, 2011.

(51) Int. Cl.
*H04Q 7/00* (2006.01)
*H04W 72/04* (2009.01)
*H04L 5/00* (2006.01)
*H04L 1/00* (2006.01)
*H04L 1/18* (2006.01)

(52) U.S. Cl.
CPC ......... *H04W 72/0406* (2013.01); *H04L 5/0048* (2013.01); *H04L 5/0053* (2013.01); *H04L 5/0035* (2013.01); *H04L 1/0031* (2013.01); *H04L 1/1861* (2013.01)

(58) Field of Classification Search
None
See application file for complete search history.

(56) References Cited

U.S. PATENT DOCUMENTS

| | | | |
|---|---|---|---|
| 6,504,827 B1 * | 1/2003 | Kuo et al. | 370/329 |
| 2004/0202113 A1 * | 10/2004 | Moon et al. | 370/252 |
| 2010/0183085 A1 | 7/2010 | Taoka et al. | |
| 2011/0002293 A1 | 1/2011 | Yuk et al. | |
| 2011/0019637 A1 * | 1/2011 | Ojala et al. | 370/329 |
| 2011/0032895 A1 | 2/2011 | Englund et al. | |
| 2012/0113866 A1 * | 5/2012 | Tenny et al. | 370/254 |
| 2013/0039235 A1 * | 2/2013 | Rahman et al. | 370/280 |
| 2014/0269395 A1 * | 9/2014 | Chen et al. | 370/252 |
| 2014/0348109 A1 * | 11/2014 | Chen et al. | 370/329 |

* cited by examiner

Primary Examiner — Duc C Ho
(74) Attorney, Agent, or Firm — McKenna Long & Aldridge LLP

(57) ABSTRACT

Disclosed is a method for a terminal to receive a control channel in a wireless communication system. More particularly, the present invention comprises the steps of: receiving a common control channel from a base station; determining an effective channel between the base station and the terminal according to a flag bit of the terminal being indicated in the common control channel; and receiving a terminal specific control channel from the base station on the basis of the effective channel, wherein the terminal specific control channel is space-multiplexes with terminal specific control channels of other terminals controlled by the base station.

12 Claims, 11 Drawing Sheets

FIG. 2
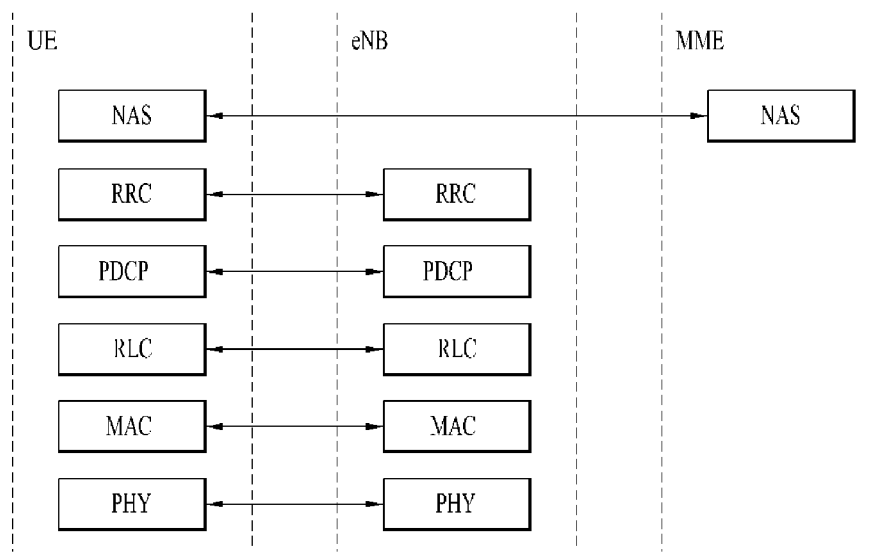
(a) CONTROL-PLANE PROTOCOL STACK
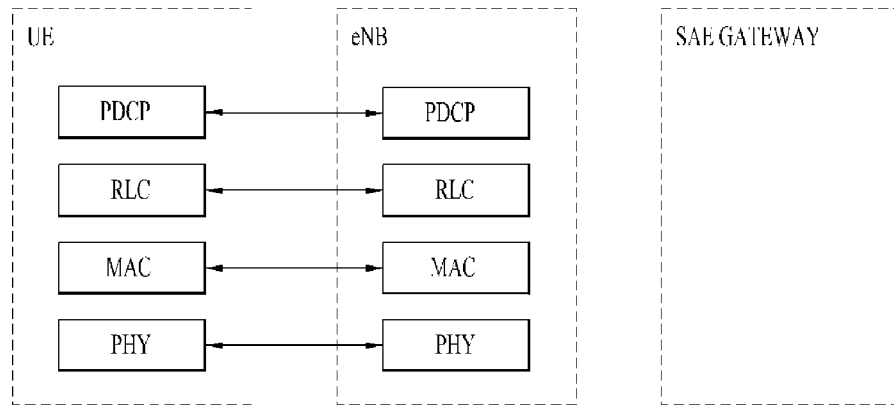
(b) USER-PLANE PROTOCOL STACK

METHOD FOR TRANSMITTING/RECEIVING CONTROL CHANNEL IN MULTICELL COOPERATIVE WIRELESS COMMUNICATION SYSTEM AND DEVICE THEREFOR This Application is a 35 U.S.C. §371 National Stage Entry of International Application No. PCT/KR2012/001301, filed Feb. 21, 2012, and claims the benefit of U.S. Provisional Application No. 61/445,553, Feb. 23, 2011, all of which are incorporated by reference in their entirety herein.

TECHNICAL FIELD

The present invention relates to a wireless communication system, and more particularly, to a method of transceiving a control channel in a multi-cell cooperative wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transceiving a control channel in a multi-cell cooperative wireless communication system and apparatus therefor shall be proposed in the following description.

Technical Solution

To achieve these and other advantages and in accordance with the purpose of the present invention, as embodied and broadly described, a method of receiving a control channel, which is received by a user equipment in a wireless communication system, according to one embodiment of the present invention may include the steps of receiving a common control channel from a base station, determining an effective channel between the base station and the user equipment in accordance with a flag bit of the user equipment indicated by the common control channel, and receiving a UE-specific (user equipment-specific) control channel from the base station based on the effective channel. In this case, the UE-specific control channel is characterized in being space-multiplexed with UE-specific control channels of other user equipments controlled by the base station.

Preferably, the method further includes the steps of receiving a reference signal from the base station and measuring a channel state between the base station and the user equipment using the reference signal.

More preferably, the method may further include the steps of calculating a precoding matrix for the UE-specific control channel based on the measured channel state and transmitting the calculated precoding matrix to the base station. In this case, the effective channel determining step includes the steps of if the flag bit is set to 1, determining the effective channel by applying the calculated precoding matrix to the measured channel state and if the flag bit is set to 0, determining the effective channel by applying a unitary matrix to the measured channel state.

Yet, the precoding matrix for the UE-specific control channel may be assumed as identical to a precoding matrix for a data channel.

To further achieve these and other advantages and in accordance with the purpose of the present invention, as embodied and broadly described, a user equipment in a wireless communication system according to one embodiment of the present invention may include a receiving module configured to receive a common control channel from a base station and a processor configured to determine an effective channel between the base station and the user equipment in accordance with a flag bit of the user equipment indicated by the common control channel, wherein the receiving module receives a UE-specific (user equipment-specific) control channel from the base station based on the effective channel.

Preferably, the receiving module receives a reference signal from the base station and the processor measures a channel state between the base station and the user equipment using the reference signal.

More preferably, the processor calculates a precoding matrix for the UE-specific control channel based on the measured channel state and the user equipment further includes a transmitting module configured to transmit the calculated precoding matrix to the base station. In this case, if the flag bit is set to 1, the processor determines the effective channel by applying the calculated precoding matrix to the measured channel state. If the flag bit is set to 0, the processor determines the effective channel by applying a unitary matrix to the measured channel state.

Advantageous Effects

According to an embodiment of the present invention, a control channel can be more effectively transceived in a multi-cell cooperative wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
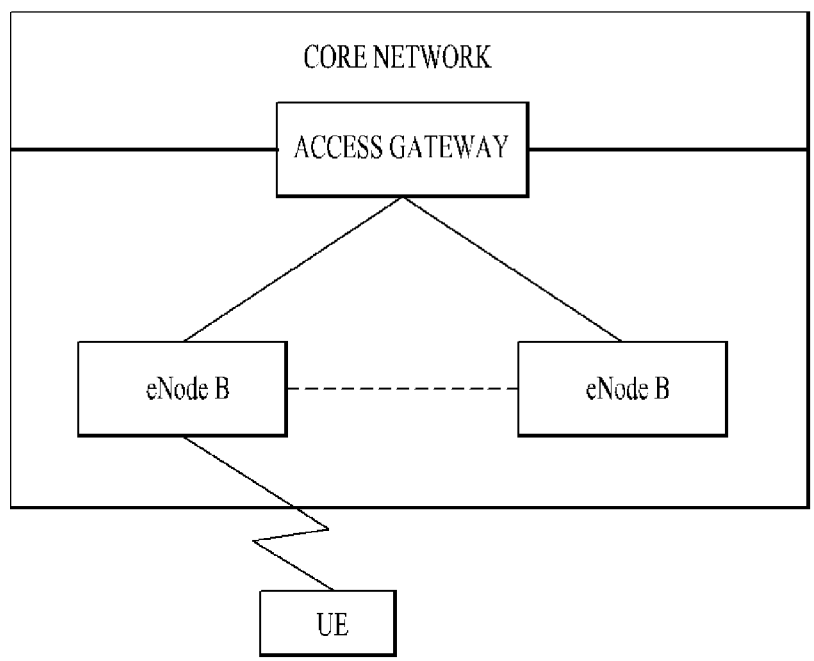
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
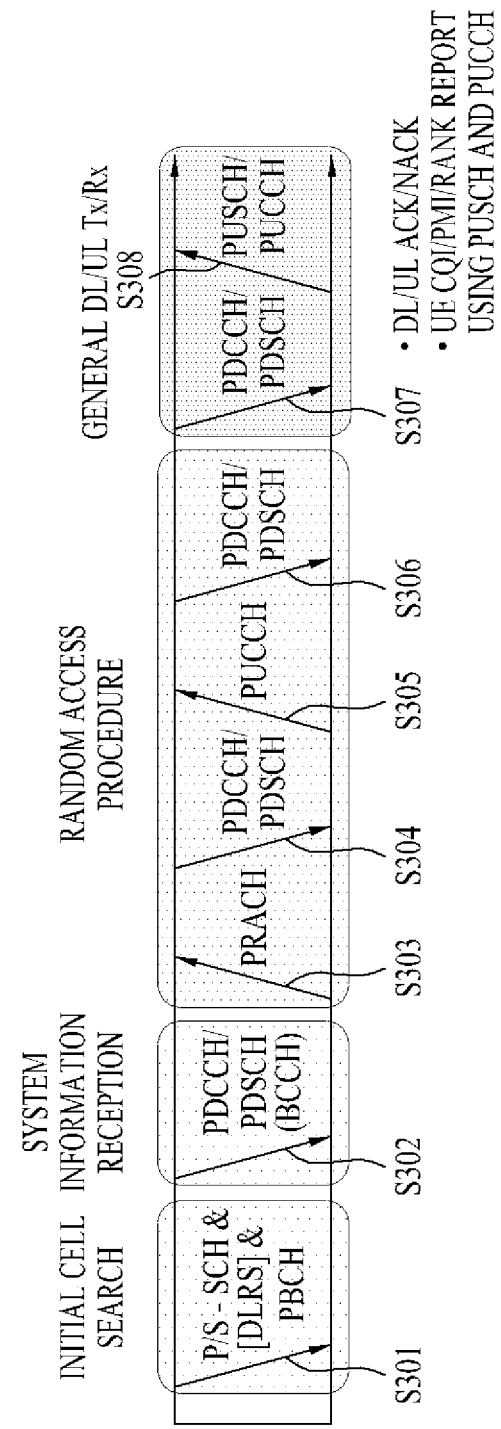
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
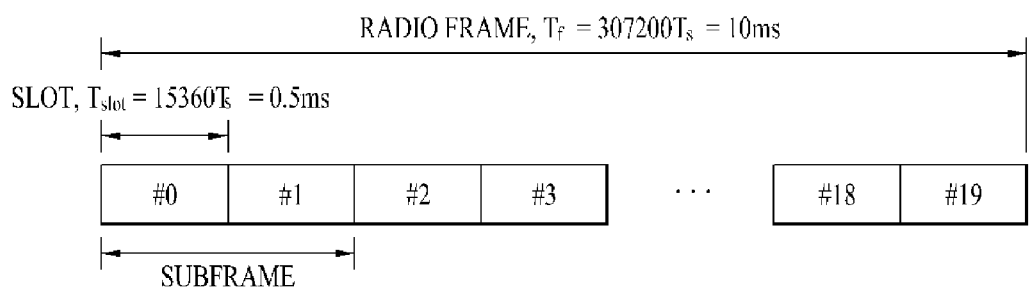
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
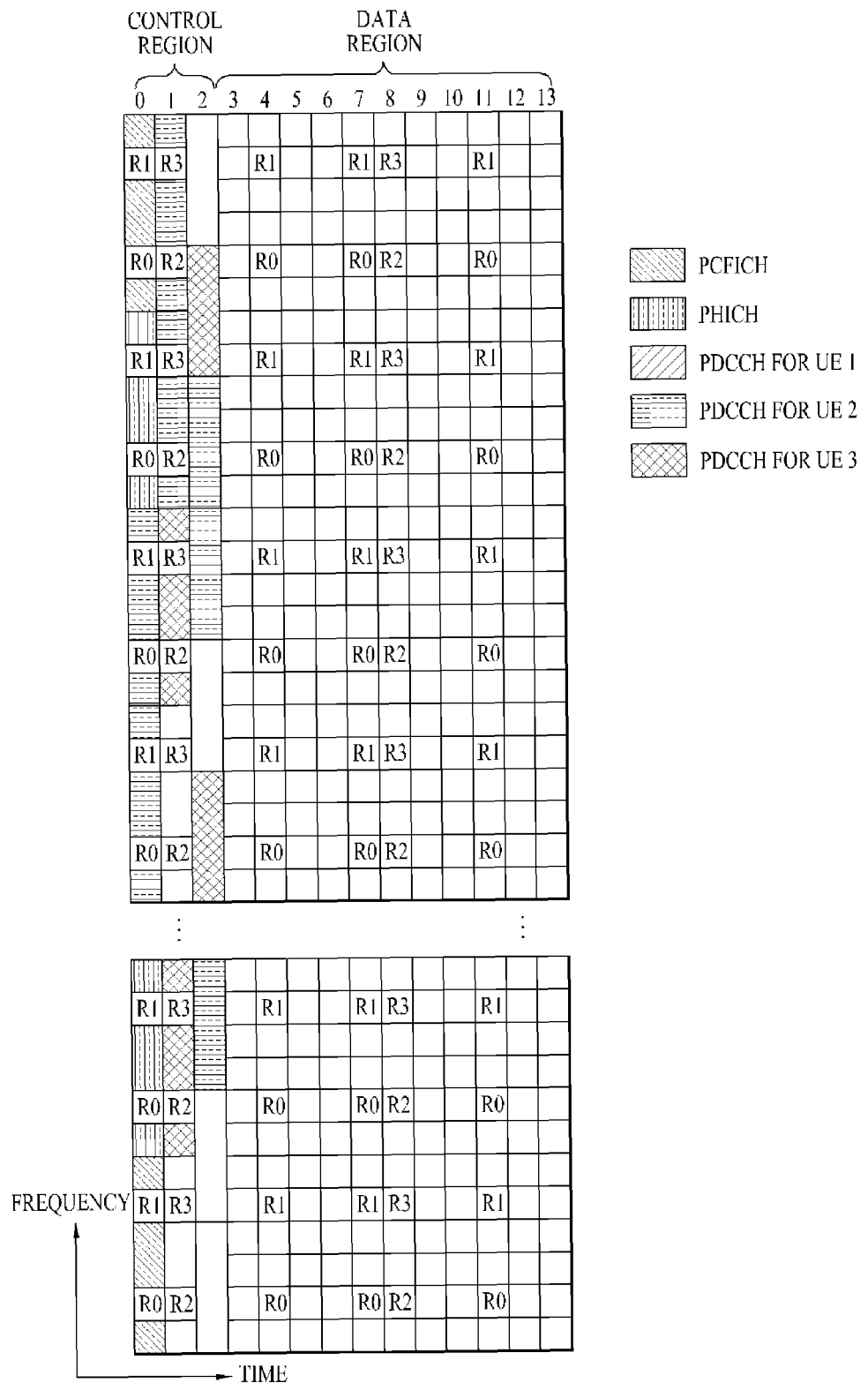
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
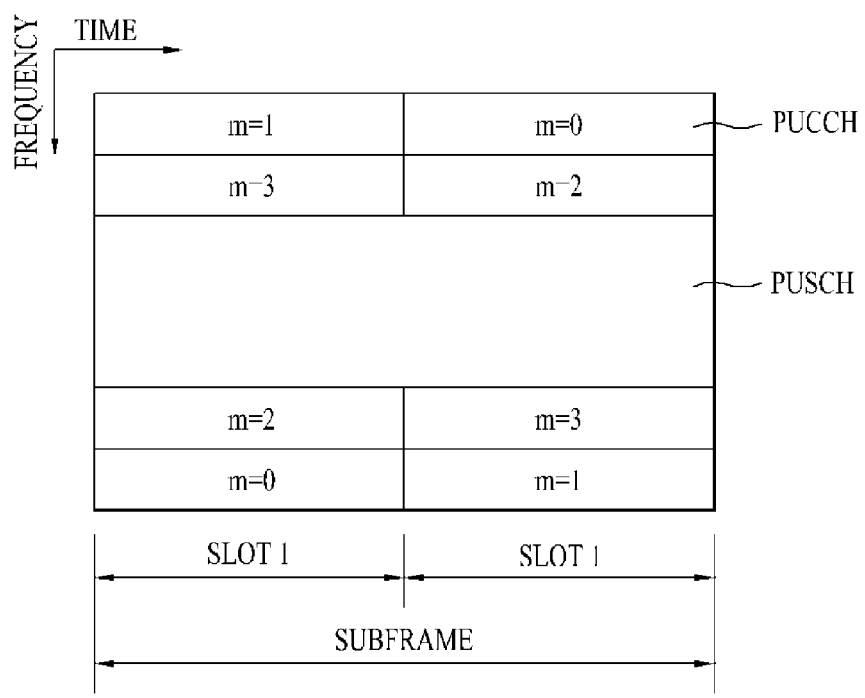
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, a reference signal is explained.

First of all, when a packet is transmitted in a wireless communication system, since the transmitted packet is transmitted on a radio channel, signal distortion may occur in the transmitting process. In order for a receiving side to correctly receive the distorted signal, it is able to receive a correct signal in a manner of finding out a channel information and then correcting the distortion of a transmitted signal by the channel information. In order to find out the channel information, a following method is mainly used. First of all, a signal known to both a transmitting side and a receiving side is transmitted. Secondly, when the signal is received on a channel, information of the channel is found out with a distorted extent of the corresponding signal. In this case, the signal known to both of the transmitting side and the receiving side is called a pilot signal or a reference signal.

Recently, when packets are transmitted in most of mobile communication systems, multiple transmitting antennas and multiple receiving antennas are adopted to increase transceiving efficiency rather than a single transmitting antenna and a single receiving antenna. In case that a transmitting or receiving side intends to achieve capacity enlargement or performance enhancement using multiple antennas, since the corresponding side can receive a correct signal if obtaining a channel status between each transmitting antenna and each receiving antenna, a separate reference signal should exist for each transmitting antenna.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like.

The latter reference signal is the reference signal transmitted together when a base station transmits DL data. IF a UE receives the corresponding reference signal, the UE can perform channel estimation, thereby demodulating data. And, the corresponding reference signal should be transmitted in a data transmitted region.

In LTE system two types of DL reference signals are defined for a unicast service. In particular, the DL reference signals may be categorized into a common reference signal (CRS) for an acquisition of information on a channel state and a measurement associated with a handover or the like and a user equipment-specific reference signal (UE-specific RS), which is called a dedicated reference signal, used for a data demodulation.

In LTE system, a UE-specific reference signal is used for data demodulation only, while a CRS is used for two kinds of purposes including channel information acquisition and data demodulation. The CRS is a cell-specific reference signal and is transmitted in each subframe across a broadband. Moreover, the CRS is transmitted based on maximum 4 antenna ports depending on the number of transmitting antennas of a base station. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

Figure 7:
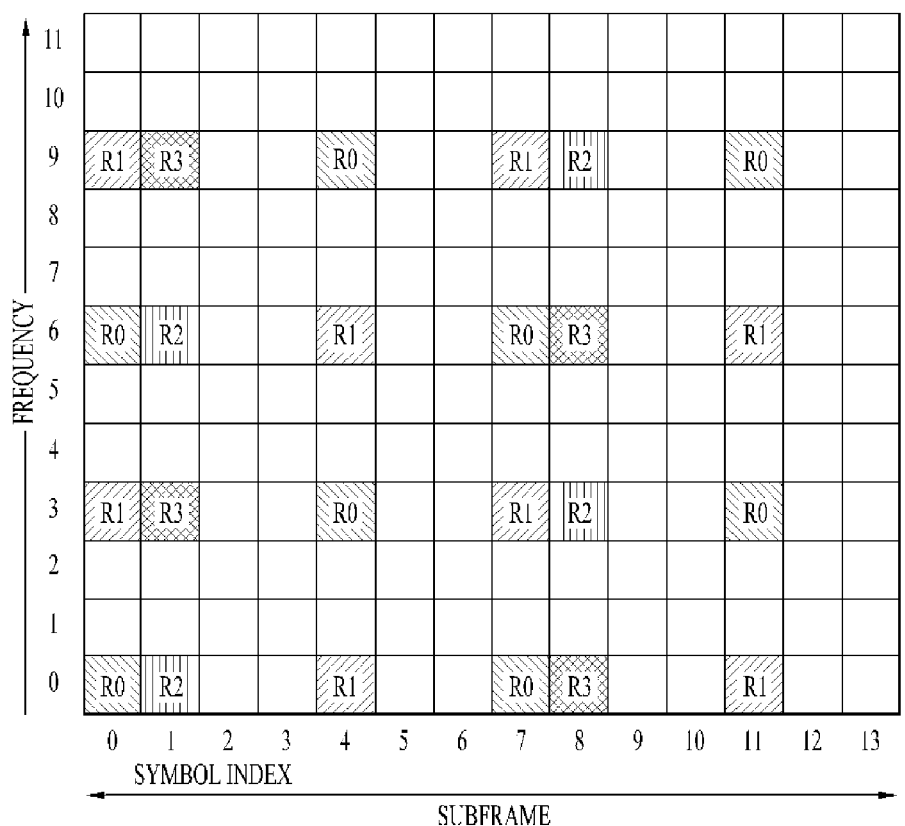
FIG. 7 is a diagram for one example of a general CRS pattern in case that 4 transmitting antenna ports exist in LTE system.

FIG. 7 is a diagram for one example of a general CRS pattern in case that 4 transmitting antenna ports exist in LTE system.

Referring to FIG. 7, in case that CRS is mapped to a time-frequency resource in LTE system, a reference signal for a single antenna port is transmitted in a manner that 1 RE is mapped to 1 RE per 6 REs on a frequency axis. Since one RB is configured with 12 REs on a frequency axis, 2 REs per RB are used for one antenna port.

Figure 8:
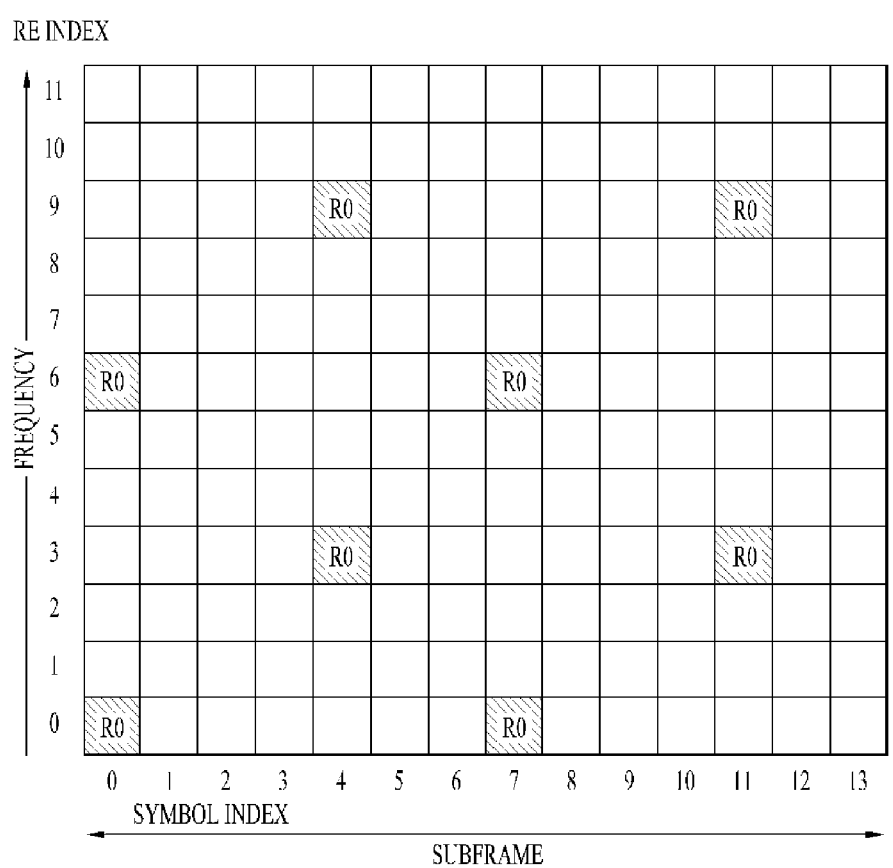
FIG. 8 is a diagram for one example of a CRS pattern for a transmitting antenna port 0 in LTE system.

FIG. 8 is a diagram for one example of a CRS pattern for a transmitting antenna port 0 in LTE system.

Meanwhile, in LTE-A system advanced and evolved from LTE system, a base station should be designed enough to support maximum 8 transmitting antennas in downlink (DL). Hence, reference signals for the maximum 8 transmitting antennas should be supported as well.

Since DL reference signals for maximum 4 antenna ports are defined in LTE system, in case that a base station includes at least 4 DL transmitting antennas or maximum 8 DL transmitting antennas in LTE-A system, it is necessary to define reference signals for these antenna ports in addition. Moreover, the reference signals for the maximum 8 transmitting antennas should be defined to include the above-mentioned two types of the reference signals including the reference signal for the channel measurement and the reference signal for the data demodulation.

In designing LTE-A system, one of important factors to be considered is backward compatibility. Namely, an LTE user equipment should operate or work well in LTE-A system without overworking and a corresponding system should support it as well. In aspect of reference signal transmission, RS for maximum 8 transmitting antennas should be additionally defined on time-frequency region in which CRS defined in LTE system is transmitted on full band each subframe In LTE-A system, if a reference signal pattern for maximum 8 transmitting antennas is added to a full band in each subframe in the same manner of the CRS of the previous LTE system, overhead increases excessively. Hence, reference signals newly designed in LTE-A system can be mainly categorized into two types including a reference signal (CSI-RS) for the purpose of channel measurement for selection of MCS, PMI or the like and a reference signal (DM-RS) for demodulation of data transmitted via 8 transmitting antennas.

The CSI-RS for the purpose of the channel measurement is characterized in being mainly designed for the purpose of measurement for channel estimation unlike that the conventional CRS is used for data demodulation as well as for the purpose of measurement for channel estimation, handover or the like. Of course, the CSI-RS can be used for the purpose of the measurement for handover or the like. Since CSI-RS is just transmitted for the purpose of obtaining information on a channel state, it may not need to be transmitted in each subframe unlike CRS.

Moreover, for data demodulation, DM-RS is transmitted as a dedicated reference signal to a UE scheduled in a corresponding time-frequency region. In particular, DM-RS transmitted to a specific UE is transmitted only in a region, in which the corresponding UE is scheduled, i.e., a time-frequency region for receiving data.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)]. On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

Meanwhile, CoMP scheme is applicable to a heterogeneous network as well as to a homogeneous network configured with macro eNB only.

Figure 9:
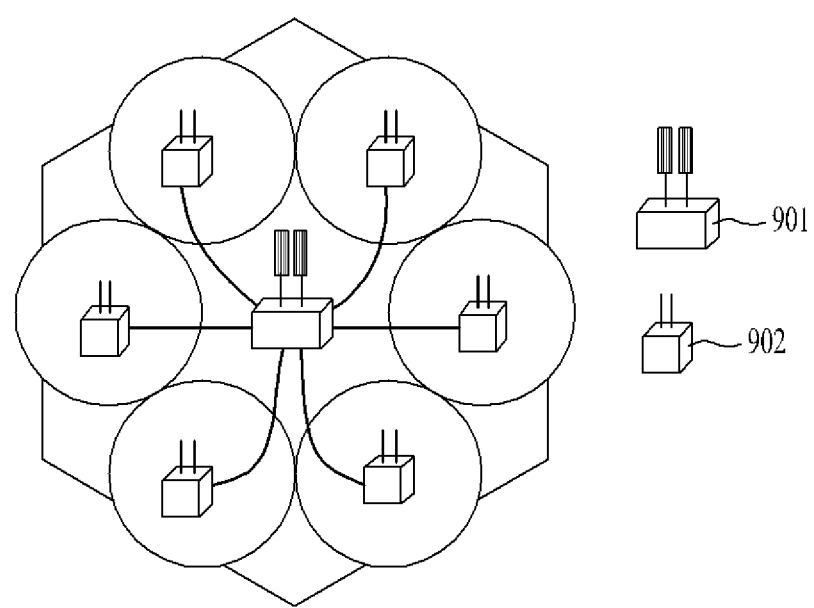
FIG. 9 is a diagram for one example of a configuration of a CoMP scheme applicable heterogeneous network.

FIG. 9 is a diagram for one example of a configuration of a CoMP scheme applicable heterogeneous network. Particularly, FIG. 9 shows a network including a macro eNB 901, an RRH (radio remote head) 902 configured to transceive a signal with a relatively small transmit power, and the like. In this case, a pico cell or RRH located within a coverage of the macro eNB can be connected to the macro eNB via an optical cable or the like. Moreover, the RRH can be named a micro eNB.

Referring to FIG. 9, since a transmit power of an RRH is relatively smaller than that of a macro eNB, it can be observed that a coverage of each RRH is relatively smaller than that of the macro eNB.

The object of the above CoMP scenario is to expect a gain of an increasing overall system throughput through cooperative transmission in-between in a manner of covering a coverage hole of a specific area through RRHs added in comparison with a previous system, in which macro eNB exists, or utilizing a multitude of transmitting points (TPs) including RRH.

Meanwhile, RRHs shown in FIG. 9 can be sorted into two types. In particular, one of the two types corresponds to a case that a cell identifier (cell-ID) different from that of a macro eNB is granted to each of the RRHs. And, each of the RRHs is regarded as another small-scale cell. The other corresponds to a case that each of the RRHs operates with the same cell identifier of the macro eNB.

In case that different cell identifiers are granted to each RRH and a macro eNB, respectively, a UE recognizes the RRH and the macro eNB as different cells. In doing so, the UE located at an edge of each cell receives considerable interference from a neighbor cell. In order to reduce such an interference effect and raise a transmission rate, various CoMP schemes have been proposed.

The above-mentioned cooperative or coordinated communication can be performed on both a data transmission and a control information transmission. For instance, when a serving cell transceives data and control information using a beam in a direction orthogonal to a dominant channel direction of a neighbor cell UE by coinciding with a dominant channel direction of a specific UE, it is able to provide a DL signal transmission to a UE at a high data rate by giving less interference to a neighbor cell. In doing so, unlike a conventional system, the serving cell should perform precoding on control information. To this end, it is able to apply a multi-rank control channel transmission utilizing a spatial resource, which is a scheme proposed by the present invention.

On the other hand, if the same cell identifier is granted to each RRH and a macro eNB, as mentioned in the foregoing description, each of the RRH and the eNB is recognized as one cell by a UE. The UE receives data from each of the RRH and the macro eNB. In case of a data channel, each UE can estimate its actual channel, on which data is transmitted, by applying a precoding used for a data transmission of each UE to a reference signal as well. In this case, the precoding applied reference signal is the DM-RS mentioned in the foregoing description.

Due to such a reason, even if a plurality of eNBs (e.g., a macro eNB and a micro eNB like RRH) having the same cell identifier exist, each of the eNBs can reuse a data channel used by a neighbor eNB. For instance, referring to FIG. 9, as there are one data channel transmitted by one macro eNB and 6 data channels respectively transmitted by 6 RRHs, there can exist total 7 data channels. As the number of data channels increases, the number of user equipments scheduled by a macro eNB and RRH with a coverage of the macro eNB increases, whereby increases overhead of a control channel.

Yet, unlike the data channel, since the control channel is received by a macro eNB and RRH on the basis of one common CRS (cell-specific reference signal), although the number of micro eNBs (i.e., RRHs) increases, if the same cell identifier is granted to the micro eNBs, there exists one control channel only. Hence, it is necessary to increase transmission capacity of a control channel. To this end, it is able to apply a multi-rank control channel transmission utilizing a spatial resource according to the present invention.

Figure 10:
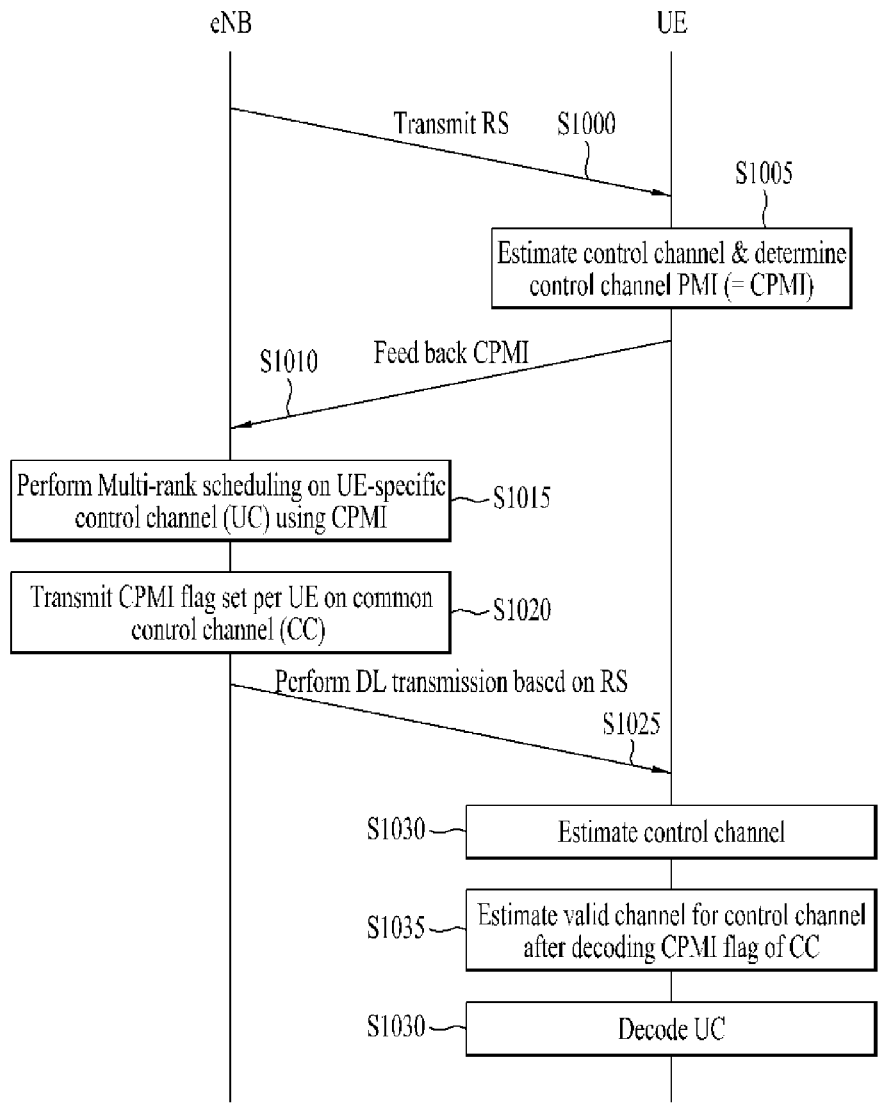
FIG. 10 is a diagram to describe a multi-rank control channel transmitting scheme according to an embodiment of the present invention.

FIG. 10 is a diagram to describe a multi-rank control channel transmitting scheme according to an embodiment of the present invention. Particularly, in FIG. 10, an eNB indicates a micro eNB or an RRH corresponding to a micro eNB.

Referring to FIG. 10, an eNB transmits such a reference signal as a CRS and a CSI-RS to a UE [S1000]. Having received the reference signal, the UE measures a control channel (H) having a precoding not applied thereto and then selects a PMI (hereinafter named CPMI), which is to be used for a UE-specific control channel transmission, based on the measured channel [S1005]. In this case, the CPMI can be selected as a value have a high correlation with a direction of a right dominant singular vector of the measured channel. In case that a channel from a neighbor base station is additionally measured, the CPMI can be selected as a value having a low correlation with a direction of a right dominant singular vector of a neighbor channel.

Subsequently, the UE feeds back the CPMI to the eNB [S1010]. Meanwhile, the UE may not feed back the CPMI additionally on the assumption that the CPMI is identical to a PMI for a data channel.

On the other hand, the eNB performs a multi-user MIMO scheduling on a UE-specific control channel (hereinafter abbreviated UC) by referring to the CPMI fed back by the UE [S1015]. In particular, interference can be minimized in a manner that user equipments having reported CPMIs orthogonal to each other are set to transmit the same control channel altogether. Multi-rank of a control channel may be used for control channel transmissions of a plurality of different UEs like MU-MIMO. Alternatively, multi-rank of a control channel may be used to transmit multi-stream for transmitting control information to one UE like SU-MIMO.

Moreover, the eNB transmits a CPMI flag per UE through a common control channel (hereinafter abbreviated CC) [S1020]. Preferably, the CPMI flag is configured with 1 bit for each UE. If a value of the CPMI flag is set to 1, it indicates that a UE-specific control channel is transmitted in a manner of being precoded using a last CPMI received from the corresponding UE. If a value of the CPMI flag is set to 0, it means that the precoding is not performed on the UE-specific control channel like the conventional scheme. For instance, when 10 UEs including UE 1 and UE 2 receives a service from a specific cell, if a UE-specific control channel for the UE1 and a UE-specific control channel for the UE 2 are space-multi-plexed through CPMI by SDMA, a CPMI flag set can be configured as Table 1 in the following.

TABLE 1

| UE1 | UE2 | UE3 | UE4 | UE5 | UE6 | UE7 | UE8 | UE9 | UE10 |
|-----|-----|-----|-----|-----|-----|-----|-----|-----|------|
| 1   | 1   | 0   | 0   | 0   | 0   | 0   | 0   | 0   | 0    |

Subsequently, the eNB performs a downlink transmission based on a reference signal [S1015].

Meanwhile, the UE measures a control channel using CRS [S1030]. Subsequently, the UE acquires the common control information by blind decoding a common search space [S1035]. In doing so, the UE checks whether a UE-specific search space for transmitting the UE-specific control channel is precoded by checking its CPMI flag. In particular, if a flag value is set to 1, the UE generates an effective channel of the UE-specific control channel by multiplying a CPMI, which is most recently fed back to the eNB, by an estimated control channel (H). Alternatively, the eNB informs the UE of index information of a finally determined CPMI together with the CPMI flag set. The UE then generates an effective channel of the UE-specific control channel of the UE by multiplying the CPMI of the corresponding index by the estimated channel (H). If the flag value is set to 0, the UE generates an effective channel of the UE-specific control channel by multiplying a unitary matrix by the estimated channel (H).

Finally, the UE acquires its UE-specific control channel by blind decoding the UE-specific search space using the generated effective channel [S1040].

Figure 11:
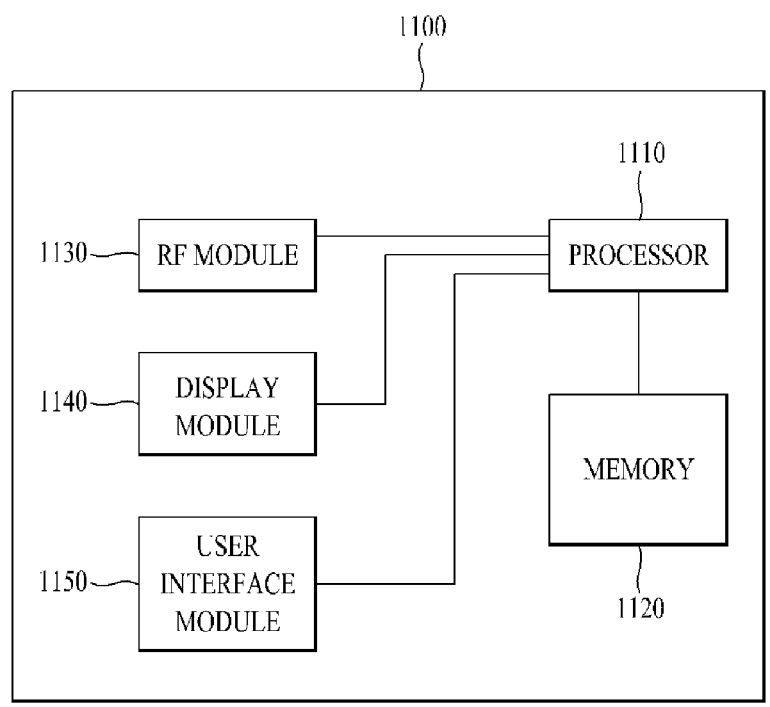
FIG. 11 is a block diagram for one example of a communication device according to one embodiment of the present invention.

FIG. 11 is a block diagram for one example of a communication device according to one embodiment of the present invention.

Referring to FIG. 11, a communication device 1100 includes a processor 1110, a memory 1120, an RF module 1130, a display module 1140 and a user interface module 1150.

The communication device 1100 is illustrated for clarity and convenience of the description and some modules can be omitted. Moreover, the communication device 1100 is able to further include at least one necessary module. And, some modules of the communication device 1100 can be further divided into sub-modules. The processor 1110 is configured to perform operations according to the embodiment of the present invention exemplarily described with reference to the accompanying drawings. In particular, the detailed operations of the processor 1110 can refer to the contents described with reference to FIGS. 1 to 10.

The memory 1120 is connected to the processor 1110 and stores operating systems, applications, program codes, data and the like. The RF module 1130 is connected to the processor 1110 and performs a function of converting a baseband signal to a radio signal or converting a radio signal to a baseband signal. For this, the RF module 1130 performs analog conversion, amplification, filtering and frequency uplink transform or inverse processes thereof. The display module 1140 is connected to the processor 1110 and displays various kinds of informations. The display module 1140 can include such a well-known element as LCD (Liquid Crystal Display), LED (Light Emitting Diode), OLED (Organic Light Emitting Diode) and the like, by which the present invention is non-limited. The user interface module 1150 is connected to the processor 1110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transceiving a control channel in a multi-cell cooperative wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of receiving a control channel by a user equipment in a wireless communication system, the method comprising the steps of:

receiving a common control channel from a base station;

determining an effective channel between the base station and the user equipment in accordance with a flag bit of the user equipment indicated by the common control channel; and receiving a UE-specific (user equipment-specific) control channel from the base station based on the effective channel.

2. The method of claim 1, further comprising:
receiving a reference signal from the base station; and
measuring a channel state between the base station and the user equipment using the reference signal.

3. The method of claim 2, further comprising:
calculating a precoding matrix for the UE-specific control channel based on the measured channel state; and
transmitting the calculated precoding matrix to the base station.

4. The method of claim 3, wherein effective channel determining the effective channel comprises:
if the flag bit is set to 1, determining the effective channel by applying the calculated precoding matrix to the measured channel state; and
if the flag bit is set to 0, determining the effective channel by applying a unitary matrix to the measured channel state.

5. The method of claim 3, wherein the precoding matrix for the UE-specific control channel is identical to a precoding matrix for a data channel.

6. The method of claim 1, wherein the UE-specific control channel is space-multiplexed with UE-specific control channels of other user equipments controlled by the base station.

7. A user equipment in a wireless communication system, the user equipment comprising:
a receiving module configured to receive a common control channel from a base station; and
a processor configured to determine an effective channel between the base station and the user equipment in accordance with a flag bit of the user equipment indicated by the common control channel,
wherein the receiving module receives a UE-specific (user equipment-specific) control channel from the base station based on the effective channel.

8. The user equipment of claim 7, wherein the receiving module receives a reference signal from the base station and wherein the processor measures a channel state between the base station and the user equipment using the reference signal.

9. The user equipment of claim 8, wherein the processor calculates a precoding matrix for the UE-specific control channel based on the measured channel state and wherein the user equipment further comprises a transmitting module configured to transmit the calculated precoding matrix to the base station.

10. The user equipment of claim 9, wherein if the flag bit is set to 1, the processor determines the effective channel by applying the calculated precoding matrix to the measured channel state and wherein if the flag bit is set to 0, the processor determines the effective channel by applying a unitary matrix to the measured channel state.

11. The user equipment of claim 9, wherein the precoding matrix for the UE-specific control channel is identical to a precoding matrix for a data channel.

12. The user equipment of claim 7, wherein the UE-specific control channel is space-multiplexed with UE-specific control channels of other user equipments controlled by the base station.

* * * * *